(12) United States Patent
Gaab et al.

(10) Patent No.: US 8,703,644 B2
(45) Date of Patent: Apr. 22, 2014

(54) SHAPED BODY CONTAINING POROUS AROMATIC FRAMEWORK MATERIAL

(75) Inventors: Manuela Gaab, Schwetzingen (DE); Stefan Maurer, Ulm (DE); Wolf-Rüdiger Krahnert, Schifferstadt (DE); Milan Kostur, Ludwigshafen (DE); Ulrich Müller, Neustadt (DE); Ranjit Gokhale, Mumbai Panvel (IN); Shrirang Bhikaji Hindalekar, Borivalli (IN)

(73) Assignee: BASF SE, Ludwigshafen (DE)

( * ) Notice: Subject to any disclaimer, the term of this patent is extended or adjusted under 35 U.S.C. 154(b) by 182 days.

(21) Appl. No.: 13/451,860

(22) Filed: Apr. 20, 2012

(65) Prior Publication Data

US 2012/0270731 A1 Oct. 25, 2012

Related U.S. Application Data

(60) Provisional application No. 61/493,529, filed on Jun. 6, 2011.

(30) Foreign Application Priority Data

Apr. 21, 2011 (IN) .......................... 1394/CHE/2011

(51) Int. Cl.
*B01J 20/26* (2006.01)
(52) U.S. Cl.
USPC .......................................... 502/402; 502/401
(58) Field of Classification Search
USPC .......................................... 502/402, 401, 439
See application file for complete search history.

(56) References Cited

U.S. PATENT DOCUMENTS

| | | |
|---|---|---|
| 2003/0148165 A1 | 8/2003 | Muller et al. |
| 2004/0265670 A1 | 12/2004 | Muller et al. |
| 2006/0185388 A1 | 8/2006 | Muller et al. |
| 2006/0210458 A1 | 9/2006 | Muller et al. |
| 2007/0209505 A1 | 9/2007 | Liu et al. |
| 2008/0190289 A1 | 8/2008 | Muller et al. |
| 2010/0331436 A1 | 12/2010 | Qiu et al. |
| 2011/0105776 A1 | 5/2011 | Muller et al. |

FOREIGN PATENT DOCUMENTS

| | | |
|---|---|---|
| DE | 102005000938 | 7/2006 |
| DE | 102005012087 | 9/2006 |
| DE | 102005022844 | 11/2006 |
| EP | 0200260 | 12/1986 |
| EP | 0102544 | 6/1988 |
| EP | 0389041 | 9/1990 |
| EP | 0592050 | 4/1994 |
| EP | 1674555 | 12/2005 |
| JP | 3037156 | 2/1991 |
| WO | WO-94/13584 | 6/1994 |
| WO | WO-94/29408 | 12/1994 |
| WO | WO-95/19222 | 7/1995 |
| WO | WO-03/064030 | 8/2003 |
| WO | WO-2005/003622 | 1/2005 |
| WO | WO-2005/049484 | 6/2005 |
| WO | WO-2006/089908 | 8/2006 |

OTHER PUBLICATIONS

International Search Report and Written Opinion in PCT/IB/2012/051966, mailed on Sep. 13, 2012, 10 pgs.

*Primary Examiner* — Edward Johnson
(74) *Attorney, Agent, or Firm* — Servilla Whitney LLC

(57) ABSTRACT

Aspects of the present invention relate to shaped bodies of compositions comprising a porous aromatic covalent framework polymer, wherein the polymer comprises at least one monomer unit, the at least one monomer unit comprising at least one aromatic ring and the at least one monomer unit having at least three binding sites to adjacent monomer units in the polymer and a core, wherein the at least three binding sites are located on at least one atom of the core and wherein the at least one atom is free of covalent bonds to hydrogen; and at least one binder additive. Other aspects of the invention relate to methods for the preparation of said shaped bodies and their uses.

20 Claims, No Drawings

SHAPED BODY CONTAINING POROUS AROMATIC FRAMEWORK MATERIAL

CROSS-REFERENCE TO RELATED APPLICATIONS

This patent application claims the benefit of pending U.S. Provisional Patent Application Ser. No. 61/493,529, filed Jun. 6, 2011 and Indian Patent Application Number 1394/CHE/2011, filed Apr. 21, 2011, the contents of both of which are incorporated in their entirety herein by reference.

FIELD

The present invention relate to shaped bodies containing a porous aromatic framework, methods for their preparation and their use.

BACKGROUND

Porous aromatic covalent framework (PAF) polymers are characterized by a rigid framework mainly comprised of aromatic rings. The framework is usually built up by addition or substitution reaction of one or more monomers. Typical reactions are C—C coupling reactions or addition reactions under ring formation. PAF polymers typically show water and temperature resistant behavior.

PAF polymers are described by, e.g., T. Ben et al, *Angew. Chem. Int. Ed.* 48 (2009), 9457-9460; Z. Wang et al., *Chem. Commun.* 46 (2010), 7730-7732; J. Schmidt et al., *Macromolecules* 42 (2009), 4426-4429; M. Rose et al., *Chem. Commun.* 2008, 2462-2464; H. Ren et al., *Chem. Commun.* 46 (2010), 291-293; A. Trewin et al., *Angew. Chem. Int. Ed.* 49 (2010), 1533-1535; J. Holst et al., *Macromolecules* 43 (2010), 8531-8538; W. Lu et al., *Chem. Mater.* 22 (2010), 5464-5472 P. Pandey et al., *J. Mat. Chem.* 21 (2011), 1700-1703 and US 2010/0331436 A1.

However these PAF polymers are generally obtained as small crystallites or powders and thus cannot be used for potential applications like the storage of gases or as carriers in catalysis in an efficient way.

SUMMARY

One aspect of the invention relates to a shaped body of a composition comprising
(a) a porous aromatic covalent framework polymer, wherein the polymer comprises at least one monomer unit, the at least one monomer unit comprising at least one aromatic ring, and the at least one monomer unit having at least three binding sites to adjacent monomer units in the polymer and a core, wherein the at least three binding sites are located on at least one atom of the core and wherein the at least one atom is free of covalent bonds to hydrogen;
(b) at least one binder additive.

In one embodiment of this aspect, the at least one monomer unit has four binding sites. In a second embodiment, the at least one aromatic ring is selected from the group consisting of benzene, naphthalene, biphenyl, pyridine, pyrimidine, pyridazine, pyrazine and triazine.

There are also several embodiments relating to the core. In one embodiment of the invention, the at least one atom of the core is a quaternary carbon atom. In another embodiment, the core of the at least one monomer unit is selected from the group consisting of

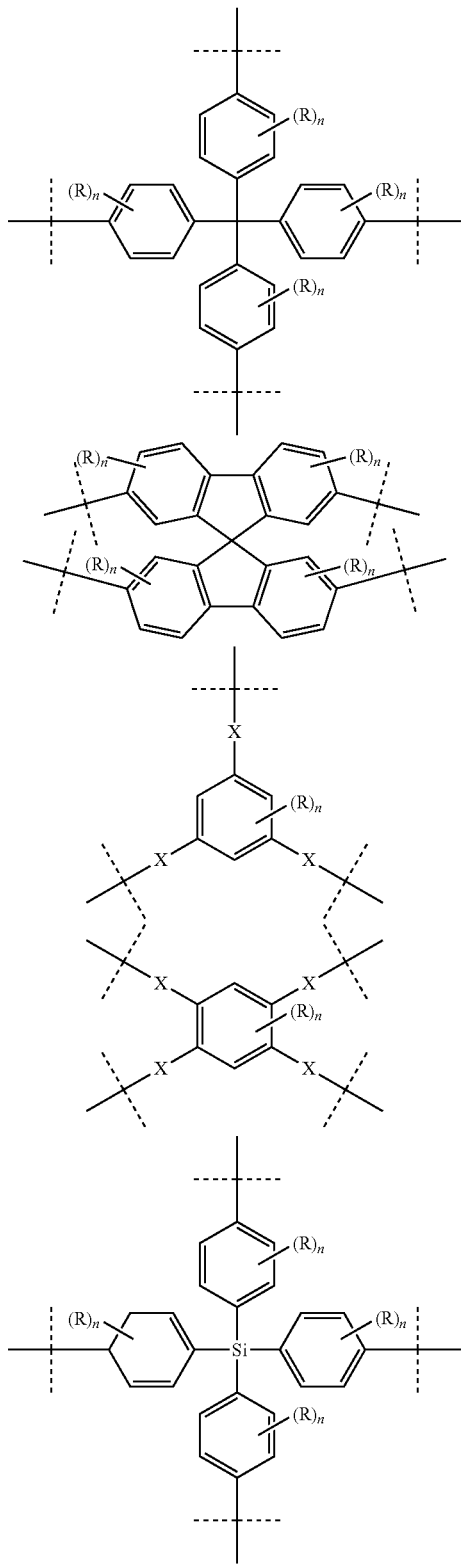

-continued

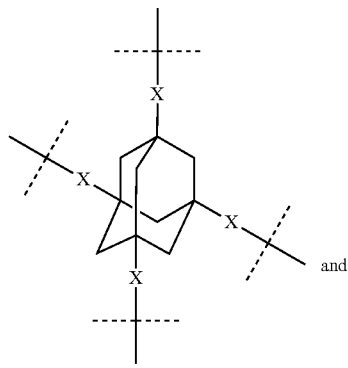
and

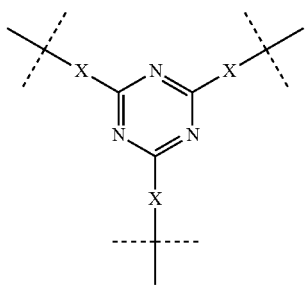

wherein n is an integer of 0, 1, 2, or 3; each R is independently selected from the group consisting of $R^1$, $NH_2$, $NHR^1$, $NR^1_2$, C(O)OH, C(O)$OR^1$, OH, and $OR^1$; $R^1$ is methyl, or ethyl; X is a phenylene or -≡-, and the dotted lines indicate the binding sites.

In another embodiment, the polymer is a homo polymer. In a further embodiment, the homopolymer consists of a monomer unit

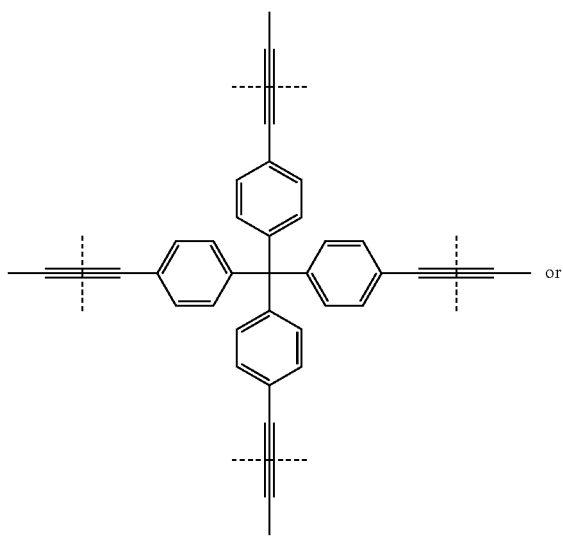

or

-continued

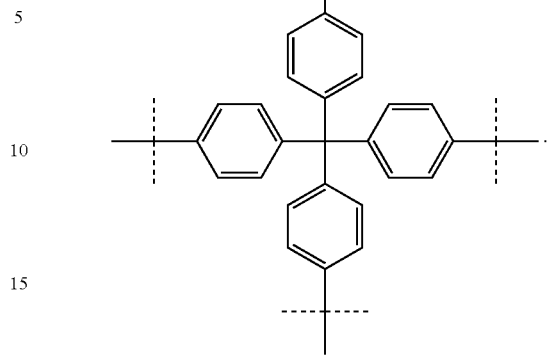

In other embodiments still, the at least one binder is an oxygen containing binder. In other variants, the at least one binder is selected from the group consisting of an oxygen-containing aluminum compound, a silicium oxide and a silicium organic compound. In yet other embodiments, the at least one binder is selected from Pural® SB, Ludox® AS 40, Silres® MSE100, tetraethyl orthosilicate.

In one or more embodiments, the amount of the porous aromatic covalent framework polymer based on the total weight of the shaped body is from about 40 to about 99 wt.-%. In other embodiments, the amount of the at least one binder additive based on the total weight of the shaped body is from about 1 to about 60 wt.-%. In other embodiments still, the shaped body has a surface area above about 50 $m^2/g$.

Other embodiments relate to the cutting hardness. For example, in one embodiment, the shaped body has a cutting hardness of about 0.5 N to about 100 N. In a variant of this embodiment, the shaped body has a diameter ranging from about 1 mm to about 10 mm, and a length ranging from about 1 mm to about 30 mm.

A second aspect of the invention relates to a method for preparing a shaped body of claim 1 comprising the steps of
(a) mixing a composition comprising the porous aromatic covalent framework polymer as defined in claim 1 and the at least one binder additive as defined in claim 1; and
(b) molding the composition into a shaped body.

In one embodiment, the molding comprises an extrusion step.

A third aspect of the invention relates to methods of using the PAF described herein. Accordingly, one aspect relates to a method of processing a substance, the method comprising up-taking at least one substance using the shaped body of claim 1 for the purposes of its storage, separation, controlled release, chemical reaction or as support. In one embodiment, the at least one substance is a gas or gas mixture. In another embodiment, the method further comprises preparing a paste-like mass or a fluid containing the porous aromatic covalent framework polymer material and the binder prior to molding.

DETAILED DESCRIPTION

In accordance with one or more embodiments of the invention, provided are PAF polymers in forms allowing a broad use of these applications. A new class of highly interesting PAF polymers has been discovered recently, which can be compared with zeolites and MOF materials in terms of their porosity.

Therefore, one aspect of the invention relates to a shaped body of a composition comprising (a) a porous aromatic covalent framework polymer, wherein the polymer comprises at least one monomer unit, the at least one monomer unit comprising at least one aromatic ring and the at least one monomer unit having at least three binding sites to adjacent monomer units in the polymer and a core, wherein the at least three binding sites are located on at least one atom of the core and wherein the at least one atom is free of covalent bonds to hydrogen; and (b) at least one binder additive.

Surprisingly, it has been found that PAF powder can be converted into shaped bodies as described herein.

The term "shaped body" as used in the present invention thereby refers to shaped bodies obtained by molding processes and to shaped bodies obtained by applying the active material onto a (porous) substrate. The term "shaped body" will be defined further below.

As described above PAF polymers and their preparation are described in, for example, Z. Wang et al., *Chem. Commun.* 46 (2010), 7730-7732; J. Schmidt et al., *Macromolecules* 42 (2009), 4426-4429; M. Rose et al., *Chem. Commun.* 2008, 2462-2464; H. Ren et al., *Chem. Commun.* 46 (2010), 291-293; A. Trewin et al., *Angew. Chem. Int. Ed.* 49 (2010), 1533-1535; J. Holst et al., *Macromolecules* 43 (2010), 8531-8538; W. Lu et al., *Chem. Mater.* 22 (2010), 5464-5472 and US 2010/0331436 A1. The content of these publications and especially the PAF polymers disclosed therein, to which reference is made herein, is fully incorporated in the content of the present application.

The porous aromatic covalent framework polymer is characterized in that the polymer comprises at least one monomer unit (like one, two, three, or more—and in specific embodiments, one or two), the at least one monomer unit comprising at least one aromatic ring and the at least one monomer unit having at least three binding sites to adjacent monomer units in the polymer and a core, wherein the at least three binding sites are located on at least one atom of the core and wherein the at least one atom is free of covalent bonds to hydrogen (to guarantee the desired rigidity).

Accordingly, "aromatic" in the term "porous aromatic framework" indicates that the at least one monomer unit has to comprise at least one aromatic ring.

In one embodiment, the at least one monomer unit has four binding sites.

In another embodiment, the at least one aromatic ring is selected from the group consisting of benzene, naphthalene, biphenyl, pyridine, pyrimidine, pyridazine, pyrazine and triazine; more specifically, benzene, pyridine and triazine; even more specifically, benzene.

In another embodiment, the at least one atom of the core is a quaternary carbon atom.

In other embodiments, the core of the at least one monomer unit is selected from the group consisting of

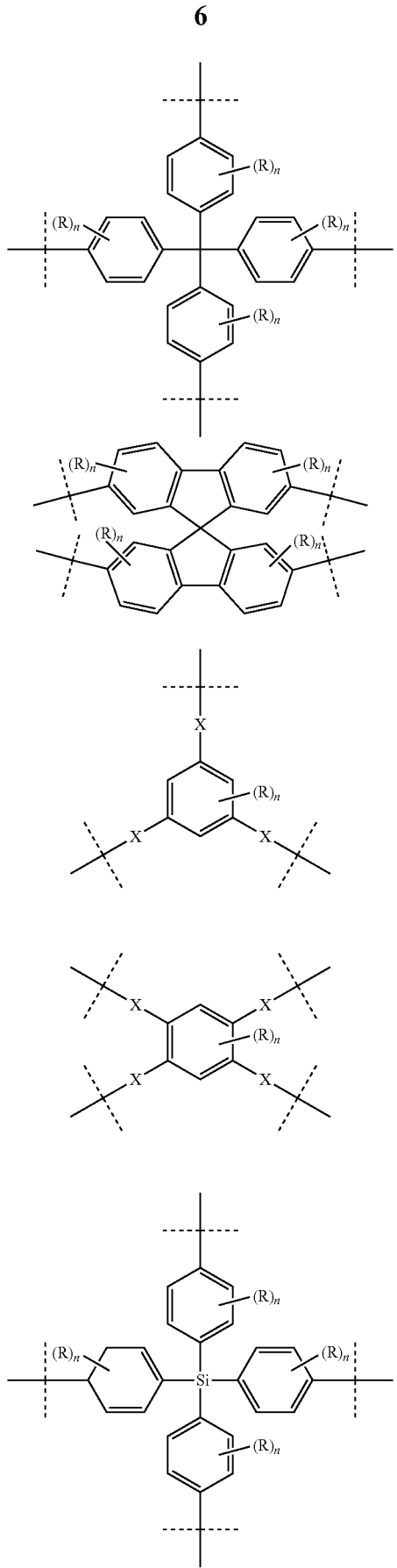

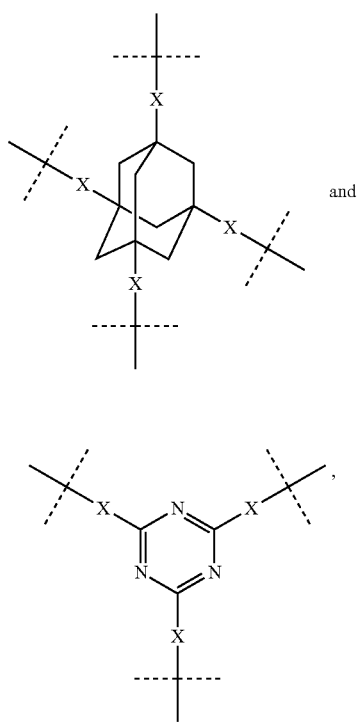

wherein n is an integer of 0, 1, 2, or 3 (and in specific embodiments, 0); each R is independently selected from the group consisting of $R^1$, $NH_2$, $NHR^1$, $NR^1{}_2$, $C(O)OH$, $C(O)OR^1$, $OH$, and $OR^1$; $R^1$ is methyl, or ethyl; X is phenylene, or -≡-, and the dotted lines indicate the binding sites.

In one or more embodiments, the polymer is a homo polymer. In specific embodiments, the monomer unit of the homo polymer comprises a tetrakisphenylmethane, a tetrakisphenylsilane, or a 1,3,5,7-tetrakisphenyladamantane moiety; more specifically, a tetrakisphenylmethane moiety. Even more specifically, the homo polymer consists of these moieties, which are interconnected by a covalent bond, -≡-, 1,2,3-triazole, 1,3,5-triazine,

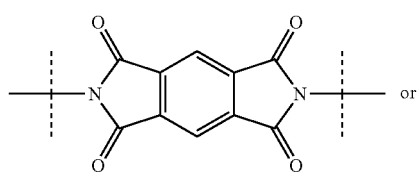

or

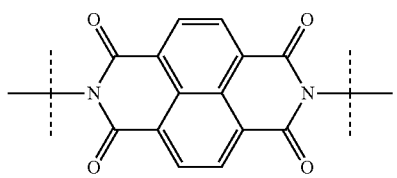

In a specific embodiment, the homo polymer consists of a monomer unit selected from the group consisting of

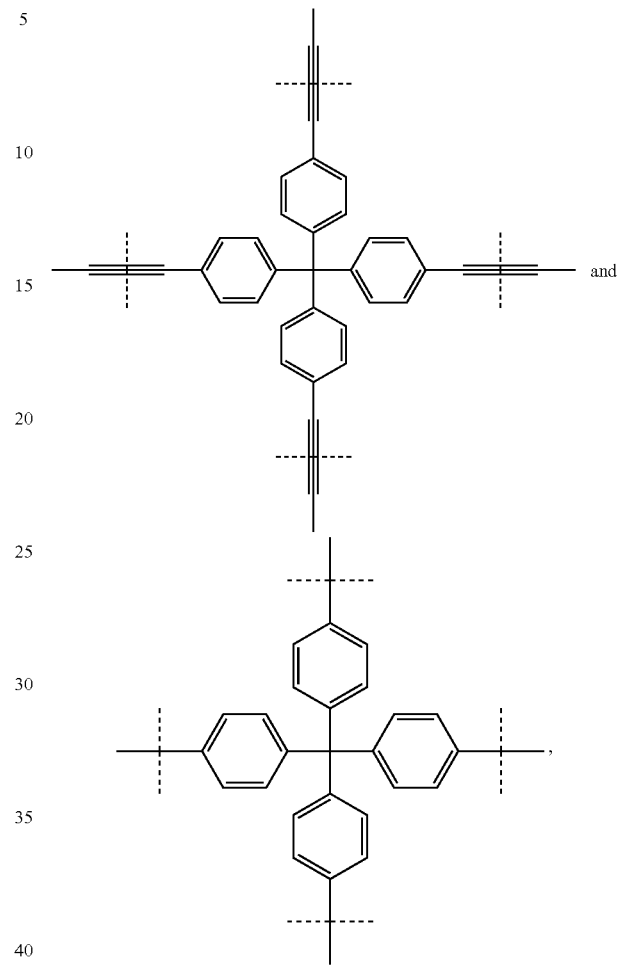

wherein the dotted lines indicate the attachment of the monomer unit to adjacent monomer units.

In addition, the shaped body of the present invention comprises at least one binder additive.

Suitable binders are described below. In specific embodiments, the at least one binder is an oxygen containing binder. In other specific embodiments, the at least one binder is selected from the group consisting of an oxygen-containing aluminium compound, a silicium oxide and a silicium organic compound, like tetraethyl orthosilicate.

Such compounds are typically commercially available under tradenames including Pural® SB, Ludox® AS 40, or Silres® MSE100.

In one embodiment, the amount of the porous aromatic covalent framework polymer based on the total weight of the shaped body is from about 40 to about 99 wt.-%.

In another embodiment, the amount of the at least one binder additive based on the total weight of the shaped body is from about 1 to about 60 wt.-%.

In a specific embodiment, the shaped body of the present invention has a cutting hardness of about 0.5 N to about 100 N. This embodiment is especially suitable for a shaped body that has a diameter of at least about 1 mm and not more than about 10 mm and a length of at least 1 mm and not more than about 30 mm. In a more specific embodiment, the cutting hardness is from about 1.5 N to about 30 N. This embodiment is especially suitable for a shaped body that has a diameter of at least 1 mm and not more than 5 mm and a length of at least 1 mm and not more than 25 mm, more specifically a diameter of at least 1 mm and not more than 4 mm and a length of at least 1 mm and not more than 20 mm, most specifically a diameter of at least 1 mm and not more than 3 mm and a length of at least 1 mm and not more than 15 mm.

The determination/measurement of the cutting hardness was carried out as described in the earlier German patent application no. 103261137.0 of Jun. 6, 2003 (BASF AG): The cutting hardness was measured on an apparatus from Zwick (model: BZ2.5/TS1S; initial loading: 0.5 N, preliminary advance rate: 10 mm/min; test speed: 1.6 mm/min) and are the means of in each case 10 measured catalyst extrudates. In detail, the cutting hardness was determined as follows: extrudates were loaded with increasing force by means of a cutter having a thickness of 0.3 mm until the extrudate had been cut through. The force required for this is the cutting hardness in N (Newton). The determination was carried out on a testing apparatus from Zwick, Ulm, having a rotating plate in a fixed position and a freely movable, vertical punch with built-in cutter having a thickness of 0.3 mm The movable punch with the cutter was connected to a load cell to record the force and during the measurement moved towards the rotating plate on which the extrudate to be measured was located. The test apparatus was controlled via a computer which recorded and evaluated the measurement results. Ten straightextrudates were taken from a well-mixed sample and their cutting hardnesses were determined and subsequently averaged. In a specific embodiment, the extrudates are crack-free.

In another specific embodiment, the specific surface area of the shaped body of the present invention, as calculated according to the Langmuir model (DIN 66131, 66134) is above about 50 $m^2/g$, further specifically above about 100 $m^2/g$, more specifically above about 150 $m^2/g$, particularly specifically above about 500 $m^2/g$ and may increase into the region above about 3000 $m^2/g$.

In one or more embodiments, the surface area per volume of the shaped bodies according to the present invention amounts to 210-325 $m^2/mL$ compared to 183 $m^2/mL$ for the PAF powder. In one or more embodiments, the ratio of the surface area per volume of the shaped bodies to the surface area per volume of the PAF powder is 1.1 to 1.8. The values obtained for the surface area were obtained according to the Langmuir model. The surface area per volume was determined by applying the bulk density of the PAF powder and the shaped bodies respectively.

Another aspect of the present invention relates to a method for preparing a shaped body of the present invention comprising the steps of
(a) mixing a composition comprising the porous aromatic covalent framework polymer as defined herein and the at least one binder additive as defined herein; and
(b) molding the composition into a shaped body.

In one or more embodiments, the molding comprises an extrusion step.

For the step of preparing shaped bodies containing PAF material, all processes of molding a powder and/or crystallites that are known to one of ordinary skill in the art are conceivable. Also, all processes of applying PAF material onto a substrate are conceivable. Preparing shaped bodies by a process involving molding is described first, followed by a description of the process of applying said material onto a (porous) substrate.

In the context of the present invention, the term "molding" refers to any process known to the expert in the field by which a substance that does not fulfill the above-mentioned requirement of a shaped body, i.e. any powder, powdery substance, array of crystallites etc., can be formed into a shaped body that is stable under the conditions of its intended use.

While the step of molding is mandatory, the following steps are optional according to the present invention:
(I) the molding may be preceded by a step of preparing a paste-like mass or a fluid containing the PAF material and the binder, for example by adding solvents or other additional substances,
(II) the molding may be followed by a step of finishing, in particular a step of drying, activating or impregnating.

The mandatory step of molding may be achieved by any method known to a person having ordinary skill in the art to achieve agglomeration of a powder, a suspension or a paste-like mass. Such methods are described, for example, in *Ullmann's Enzyklopädie der Technischen Chemie*, $4^{th}$ Edition, Vol. 2, p. 313 et seq., 1972, the respective content of which is incorporated into the present application by reference.

In general, the following main pathways can be discerned: (i) briquetting, i.e. mechanical pressing of the powdery material, with or without binders and/or other additives, (ii) granulating (pelletizing), i.e. compacting of moistened powdery materials by subjecting it to rotating movements, and (iii) sintering, i.e. subjecting the material to be compacted to a thermal treatment. The latter is somewhat limited for the PAF material according to the invention due to the limited temperature stability of the organic materials.

The molding step according to one or more embodiments of the invention is performed by using at least one method selected from the following group: briquetting by piston presses, briquetting by roller pressing, briquetting with binders, pelletizing, compounding, melting, extruding, co-extruding, spinning, deposition, foaming, spray drying, coating, granulating, in particular spray granulating or granulating according to any process known within the processing of plastics or any combination of at least two of the aforementioned methods.

The preferred processes of molding are those in which the molding is affected by extrusion in conventional extruders, for example such that result in extrudates having a diameter of, usually, from about 1 to about 10 mm, in particular from about 1 to about 5 mm. Such extrusion apparatuses are described, for example, in *Ullmann's Enzyklopädie der Technischen Chemie*, 4th Edition, Vol. 2, p. 295 et seq., 1972. According to some embodiments, in addition to the use of an extruder, an extrusion press is also used for molding.

The molding can be performed at elevated pressure (ranging from atmospheric pressure to several 100 bar), at elevated temperatures (ranging from room temperature to 300° C.) or in a protective atmosphere (noble gases, nitrogen or mixtures thereof). Any combinations of these conditions are possible as well.

The step of molding is performed in the presence of at least one binder and optionally other additional substances that stabilize the materials to be agglomerated. As to the at least one binder, any material known to the expert to promote adhesion between the particles to be molded together can be employed. A binder, an organic viscosity-enhancing compound and/or a liquid for converting the material into a paste can be added to the PAF material, with the mixture being subsequently compacted in a mixing or kneading apparatus or an extruder. The resulting plastic material can then be molded, in particular using an extrusion press or an extruder, and the resulting moldings can then be subjected to the optional step (II) of finishing, for example drying, activating or impregnating.

A number of compounds can be used as binders. For example, according to U.S. Pat. No. 5,430,000, titanium dioxide or hydrated titanium dioxide is used as the binder. Examples of other binders are:

- hydrated alumina or other aluminum-containing binders (WO 94/29408);
- mixtures of silicon and aluminum compounds (WO 94/13584);
- silicon compounds (EP 0 592 050);
- clay minerals (JP 03 037 156);
- alkoxysilanes (EP 0 102 544);
- amphiphilic substances.

Other conceivable binders are in principle all compounds used to date for the purpose of achieving adhesion in powdery materials. In specific embodiments, compounds, in particular oxygen-containing, of silicon, of aluminum, of boron, of phosphorus, of zirconium and/or of titanium are used. Of particular interest as a binder are alumina, silica, where the $SiO_2$ may be introduced into the shaping step as a silica sol or in the form of tetraalkoxysilanes, and silicones. Oxides of magnesium and of beryllium and clays, for example montmorillonites, kaolins, bentonites, halloysites, dickites, nacrites and anauxites, may furthermore be used as binders. Tetraalkoxysilanes are particularly used as binders in the present invention. In another specific example, tetramethoxysilane, tetraethoxysilane, tetrapropoxysilane and tetrabutoxysilane, the analogous tetraalkoxytitanium and tetraalkoxyzirconium compounds and trimethoxy-, triethoxy-, tripropoxy- and tributoxyaluminum, tetramethoxysilane and tetraethoxysilane are utilized.

In addition, organic viscosity-enhancing substances and/or hydrophilic polymers, e.g. cellulose or polyacrylates may be used. The organic viscosity-enhancing substance used may likewise be any substance suitable for this purpose. Those used in some embodiments are in particular hydrophilic polymers, e.g., cellulose, starch, polyacrylates, polymethacrylates, polyvinyl alcohol, polyvinylpyrrolidone, polyisobutene and polytetrahydrofuran. These substances primarily promote the formation of a plastic material during the kneading, molding and drying step by bridging the primary particles and moreover ensuring the mechanical stability of the molding during the molding and the optional drying process.

There are no restrictions at all with regard to the optional liquid which may be used to create a paste-like substance, either for the optional step (I) of mixing or for the mandatory step of molding. In addition to water, alcohols may be used, provided that they are water-miscible. Accordingly, both monoalcohols of 1 to 4 carbon atoms and water-miscible polyhydric alcohols may be used. In particular, methanol, ethanol, propanol, n-butanol, isobutanol, tert-butanol and mixtures of two or more thereof are used. However toluene is also suitable.

Amines or amine-like compounds, for example tetraalkylammonium compounds or aminoalcohols, and carbonate-containing substances, such as calcium carbonate, may be used as further additives. Such further additives are described in, for example, EP 0 389 041, EP 0 200 260 and WO 95/19222, which are incorporated fully by reference in the context of the present application.

Most, if not all, of the additive substances mentioned above may be removed from the shaped bodies by drying or heating, optionally in a protective atmosphere or under vacuum. In order to keep the PAF material intact, in some embodiments, the shaped bodies are not exposed to temperatures exceeding 300° C. However, studies show that heating/drying under the aforementioned mild conditions, in particular drying in vacuo, specifically well below 300° C. is sufficient to at least remove organic compounds and water out of the pores of the PAF material. Generally, the conditions are adapted and chosen depending upon the additive substances used.

In general it is possible either to add first the binder, then, for example, the PAF material and, if required, the additive and finally the mixture containing at least one alcohol and/or water or to interchange the order with respect to any of the aforementioned components.

As far as the step of mixing is concerned, for example, of the material containing a PAF material and a binder and optionally further process materials (=additional materials), all methods known to the expert in the fields of materials processing and unit operations can be used. In embodiments where the mixing occurs in the liquid phase, stiffing may be employed. In embodiments where the mass to be mixed is paste-like, kneading and/or extruding may be employed. In embodiments where the components to be mixed are all in a solid, powdery state, mixing is may be employed. The use of atomizers, sprayers, diffusers or nebulizers is conceivable as well if the state of the components to be used allows the use thereof. In embodiments where the materials are paste-like or powder-like, the use of static mixers, planetary mixers, mixers with rotating containers, pan mixers, pug mills, shearing-disk mixers, centrifugal mixers, sand mills, trough kneaders, internal mixers, and continuous kneaders may be used. It is explicitly included that a process of mixing may be sufficient to achieve the molding, i.e., that the steps of mixing and molding coincide.

Other aspects of the present invention further provide for the use of a shaped body according to the invention for the uptake of at least one substance for the purposes of its storage, separation, controlled release, chemical reaction or as support.

Accordingly, a further aspect of the present invention is a method of storing, separating, controlled releasing, for carrying out a chemical reaction or for preparing a support, the method comprising the step of contacting the shaped body of the present invention with at least one substance.

In one or more embodiments, the at least one substance is a gas or a gas mixture. Liquids and metals are also possible.

Processes for storage by means of shaped bodies according to the present invention can be used as known for shaped bodies of metal organic frameworks. In general these are described in WO 2005/003622, WO 2003/064030, WO 2005/049484, WO 2006/089908 and DE 10 2005 012 087. In specific embodiments, the gases for storage are methane, methane containing gas mixtures, like natural gas, shale gas or town gas, and hydrogen.

Processes for separation or purification by means of shaped bodies according to the present invention can be used as known for shaped bodies of metal organic frameworks. In general these are described in EP 1 674 555, DE 10 2005 000938 and DE 10 2005 022 844. In one embodiment, a gas which is separated off is carbon dioxide, in particular from a gas mixture which further comprises carbon monoxide.

In embodiments where the shaped bodies of the invention are used for storage, this may be carried out in a temperature range from about −200° C. to about +80° C. In further embodiments, the temperature range is from about −80° C. to about +80° C. In other embodiments, the pressure range is from about 1 bar to about 200 bar (absolute), and more specifically from about 2 bar to about 100 bar.

For the purposes of the present invention, the terms "gas" and "liquid" are used in the interests of simplicity, but gas mixtures and liquid mixtures or liquid solutions are likewise encompassed by the term "gas" or "liquid".

In specific embodiments, the gases are hydrogen, natural gas, town gas, hydrocarbons, in particular methane, ethane, ethene, acetylene, propane, propene, n-butane and i-butane, 1-butene, 2-butene, carbon monoxide, carbon dioxide, nitrogen oxides, oxygen, sulfur oxides, halogens, halogenated hydrocarbons, $NF_3$, $SF_6$, ammonia, hydrogen sulfide, ammonia, formaldehyde, noble gases, in particular helium, neon, argon, krypton and xenon.

In another specific embodiment, the framework of the invention is used for the storage of a gas at a minimum pressure of about 1 bar (absolute). In a further embodiment, the minimum pressure can be about 3 bar (absolute), and more specifically about 10 bar (absolute). The gas is in these embodiments may be hydrogen, methane or a methane containing gas, like natural gas, shale gas or town gas.

In one or more embodiments, the gas is carbon dioxide, which is separated off from a gas mixture comprising carbon dioxide. The gas mixture may comprise carbon dioxide together with at least $H_2$, $CH_4$ or carbon monoxide. In particular embodiments, the gas mixture comprises carbon monoxide in addition to carbon dioxide. In further embodiments, mixtures comprise at least 10 and not more than 45% by volume of carbon dioxide and at least 30 and not more than 90% by volume of carbon monoxide.

One variant relates to pressure swing adsorption using a plurality of parallel adsorber reactors, with the adsorbent bed being made up completely or partly of the material according to the invention. In a further variant, the adsorption phase for the $CO_2/CO$ separation takes place at $CO_2$ partial pressure of from 0.6 to 3 bar and a temperature of at least 20° C., but not more than 70° C. To desorb the adsorbed carbon dioxide, the total pressure in the adsorber reactor concerned is usually reduced to values in the range from 100 mbar to 1 bar.

However, the at least one substance can also be a liquid. Examples of such a liquid are disinfectants, inorganic or organic solvents, fuels, in particular gasoline or diesel, hydraulic fluid, radiator fluid, brake fluid or an oil, in particular machine oil. The liquid can also be halogenated aliphatic or aromatic, cyclic or acyclic hydrocarbons or mixtures thereof. In particular, the liquid can be acetone, acetonitrile, aniline, anisol, benzene, benzonitrile, bromobenzene, butanol, tert-butanol, quinoline, chlorobenzene, chloroform, cyclohexane, diethylene glycol, diethyl ether, dimethylacetamide, dimethylformamide, dimethyl sulfoxide, dioxane, glacial acetic acid, acetic anhydride, ethyl acetate, ethanol, ethylene carbonate, ethylene dichloride, ethylene glycol, ethylene glycol dimethyl ether, formamide, hexane, isopropanol, methanol, methoxypropanol, 3-methyl-1-butanol, methylene chloride, methyl ethyl ketone, N-methylformamide, N-methylpyrrolidone, nitrobenzene, nitromethane, piperidine, propanol, propylene carbonate, pyridine, carbon disulfide, sulfolane, tetrachloroethene, carbon tetrachloride, tetrahydrofuran, toluene, 1,1,1-trichloroethane, trichloroethylene, triethylamine, triethylene glycol, triglyme, water or mixtures thereof.

Furthermore, the at least one substance can be an odorous substance. In such embodiments, the odorous substance can be a volatile organic or inorganic compound which comprises at least one of the elements nitrogen, phosphorus, oxygen, sulfur, fluorine, chlorine, bromine or iodine or is an unsaturated or aromatic hydrocarbon or a saturated or unsaturated aldehyde or a ketone. Specific elements include nitrogen, oxygen, phosphorus, sulfur, chlorine, bromine; and more specifically nitrogen, oxygen, phosphorus and sulfur.

In one embodiment, the odorous substance may comprise ammonia, hydrogen sulfide, sulfur oxides, nitrogen oxides, ozone, cyclic or acyclic amines, thiols, thioethers and aldehydes, ketones, esters, ethers, acids or alcohols. In a specific embodiment, the odorous substance comprises ammonia, hydrogen sulfide, organic acids (specifically acetic acid, propionic acid, butyric acid, isobutyric acid, valeric acid, isovaleric acid, caproic acid, heptanoic acid, lauric acid, pelargonic acid) and cyclic or acyclic hydrocarbons comprising nitrogen or sulfur and saturated or unsaturated aldehydes such as hexanal, heptanal, octanal, nonanal, decanal, octenal or nonenal and in particular volatile aldehydes such as butyraldehyde, propionaldehyde, acetaldehyde and formaldehyde and also fuels such as gasoline, diesel (constituents).

The odorous substances can also be fragrances which are used, for example, for producing perfumes. Examples of fragrances or oils which can release such fragrances are: essential oils, basil oil, geranium oil, mint oil, cananga oil, cardamom oil, lavender oil, peppermint oil, nutmeg oil, camomile oil, eucalyptus oil, Rosemary oil, lemon oil, lime oil, orange oil, bergamot oil, muscatel sage oil, coriander oil, cypress oil, 1,1-dimethoxy-2-phenylethane, 2,4-dimethyl-4-phenyltetrahydrofuran, dimethyltetrahydrobenzaldehyde, 2,6-dimethyl-7-octen-2-ol, 1,2-diethoxy-3,7-dimethyl-2,6-octadiene, phenylacetaldehyde, rose oxide, ethyl 2-methylpentanoate, 1-(2,6,6-trimethyl-1,3-cyclohexadien-1-yl)-2-buten-1-one, ethyl vanillin, 2,6-dimethyl-2-octenol, 3,7-dimethyl-2-octenol, tert-butylcyclohexyl acetate, anisyl acetate, allyl cyclohexyloxyacetate, ethyllinalool, eugenol, coumarin, ethyl acetoacetate, 4-phenyl-2,4,6-trimethyl-1,3-dioxane, 4-methylene-3,5,6,6-tetramethyl-2-heptanone, ethyl tetrahydrosafranate, geranyl nitrile, cis-3-hexen-1-ol, cis-3-hexenyl acetate, cis-3-hexenyl methyl carbonate, 2,6-dimethyl-5-hepten-1-al, 4-(tricyclo[5.2.1.0]decylidene)-8-butanal, 5-(2,2,3-trimethyl-3-cyclopentenyl)-3-methylpentan-2-ol, p-tert-butyl-alpha-methylhydrocinnamaldehyde, ethyl[5.2.1.0]tricyclodecanecarboxylate, geraniol, citronellol, citral, linalool, linalyl acetate, ionone, phenylethanol and mixtures thereof.

In one or more embodiments, a volatile odorous substance has a boiling point or boiling point range below 300° C. In further embodiments, the odorous substance is a readily volatile compound or mixture. In particular, the odorous substance has a boiling point or boiling range below 250° C., specifically below 230° C., and more specifically below 200° C.

In one or more embodiments, the odorous substances have a high volatility. The vapor pressure can be employed as a measure of the volatility. In further embodiments, a volatile odorous substance has a vapor pressure of more than about 0.001 kPa (20° C.). The odorous substance can be a readily volatile compound or mixture. In specific embodiments, the odorous substance has a vapor pressure of more than about 0.01 kPa (20° C.), more preferably a vapor pressure of more than about 0.05 kPa (20° C.). Particular preference is given to the odorous substances having a vapor pressure of more than about 0.1 kPa (20° C.).

In addition, the shaped bodies of the invention can be used as support, in particular as support of a catalyst.

EXAMPLES

The following examples show different approaches to prepare shaped bodies from PAF material. The powder of the PAF material used was prepared according to T. Ben et al, *Angew. Chem. Int. Ed.* 48 (2009), 9457-9460 and exhibited the following properties: $N_2$ surface area: 2859 m²/g according to Langmuir; bulk density: 0.064 g/mL; skeletal density: 1.17 g/mL; water adsorption: 0.1-0.4% by weight at relative humidity of 10-80%. The determination/measurement of the cutting hardness was carried out as described in the earlier German patent application no. 103261137.0 of Jun. 6, 2003 (BASF AG): The cutting hardnesses were measured on an apparatus from Zwick (model: BZ2.5/TS1S; initial loading: 0.5 N, preliminary advance rate: 10 mm/min; test speed: 1.6 mm/min) and are the means of in each case 10 measured catalyst extrudates. In detail, the cutting hardness was determined as follows: Extrudates were loaded with increasing force by means of a cutter having a thickness of 0.3 mm until the extrudate had been cut through. The force required for this is the cutting hardness in N (Newton). The determination was carried out on a testing apparatus from Zwick, Ulm, having a rotating plate in a fixed position and a freely movable, vertical punch with built-in cutter having a thickness of 0.3 mm. The movable punch with the cutter was connected to a load cell to record the force and during the measurement moved towards the rotating plate on which the extrudate to be measured was located. The test apparatus was controlled via a computer which recorded and evaluated the measurement results. 10 straight, preferably crack-free extrudates were taken from a well-mixed sample and their cutting hardnesses were determined and subsequently averaged.

Example 1

Extruding Shaped Bodies of PAF Material Using Silres® MSE100

According to the invention, 1.6 g of PAF material were kneaded with 0.1 g of methyl-cellulose at room temperature for 5 minutes. 0.6 to 1.0 g of Silres® MSE100 (methylsilicone, 70% by weight solution in toluene) was added and the mixture was kneaded for 5 minutes. The mixture was densified with 13.5 mL of water using a mortar. The paste was placed in a ram extruder and extruded to form 2.0 mm extrudates. The extrudates were dried at 120° C. in a drying oven for 23 h. The cutting hardness of the shaped bodies was 2.5 N, the $N_2$ surface area was 1617 $m^2/g$ according to Langmuir. The bulk density amounted to 0.13 g/mL.

Example 2

Extruding Shaped Bodies of PAF Material Using Ludox® AS 40

According to the invention, 1.0 g of PAF material was kneaded with 0.09 g of methyl-cellulose at room temperature for 2 minutes. 0.6 g of Ludox® AS 40 (colloidal silica, 39.5% by weight solution in ammoniacal water) and two portions 5.0 and 3.0 mL of water were added and the mixture was densified for 5 minutes after each addition. The paste was placed in a ram extruder and extruded to form 2.0 mm extrudates. The extrudates were dried at 120° C. in a drying oven for 23 h. The cutting hardness of the shaped bodies was 3.3 N, the $N_2$ surface area was 2029 $m^2/g$ according to Langmuir and the bulk density amounted to 0.14 g/mL.

Example 3

Extruding Shaped Bodies of PAF Material Using Pural® SB

According to the invention, 1.0 g of PAF material was kneaded with 0.33 g of Pural® SB at room temperature for 2 minutes. A solution of 0.01 g of formic acid in 2.0 mL of water was added and the mixture was densified for 5 minutes. 6.0 mL of water were added and the mixture was densified for 5 minutes. The paste was placed in a ram extruder and extruded to form 2.0 mm extrudates. The extrudates were dried at 120° C. in a drying oven for 23 h. The cutting hardness of the shaped bodies was 3.8 N, the $N_2$ surface area was 2323 $m^2/g$ according to Langmuir and the bulk density amounted to 0.14 g/mL.

Example 4

Extruding Shaped Bodies of PAF Material Using Tetraethyl Orthosilicate

According to the invention, 1.0 g of PAF material was kneaded with 0.09 g of methyl-cellulose at room temperature for 2 minutes. 0.9 g of tetraethyl orthosilicate and two portions (3.0 mL each) of water were added and the mixture was densified for 5 minutes after each addition. The paste was placed in a ram extruder and extruded to form 2.0 mm extrudates. The extrudates were dried at 120° C. in a drying oven for 23 h. The cutting hardness of the shaped bodies was 8.3 N, the $N_2$ surface area was 1806 $m^2/g$ according to Langmuir and the bulk density amounted to 0.18 g/mL.

The invention claimed is:

1. A shaped body of a composition comprising
   (a) a porous aromatic covalent framework polymer, wherein the polymer comprises at least one monomer unit, the at least one monomer unit comprising at least one aromatic ring, and the at least one monomer unit having at least three binding sites to adjacent monomer units in the polymer and a core, wherein the at least three binding sites are located on at least one atom of the core and wherein the at least one atom is free of covalent bonds to hydrogen;
   (b) at least one binder additive.

2. The shaped body of claim 1, wherein the at least one monomer unit has four binding sites.

3. The shaped body of claim 1, wherein the at least one aromatic ring is selected from the group consisting of benzene, naphthalene, biphenyl, pyridine, pyrimidine, pyridazine, pyrazine and triazine.

4. The shaped body of claim 1, wherein the at least one atom of the core is a quaternary carbon atom.

5. The shaped body of claim 1, wherein the core of the at least one monomer unit is selected from the group consisting of

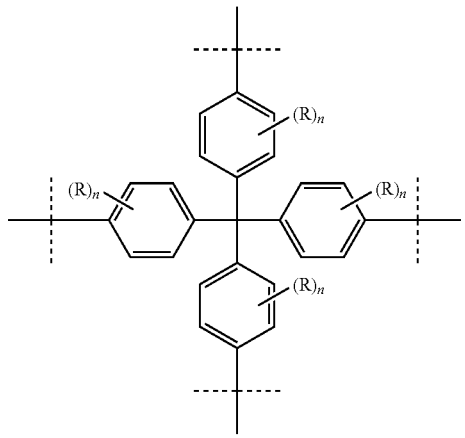

-continued

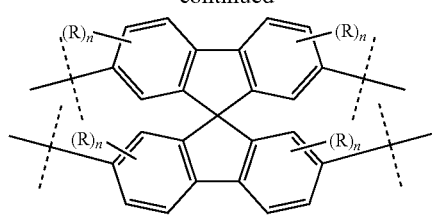

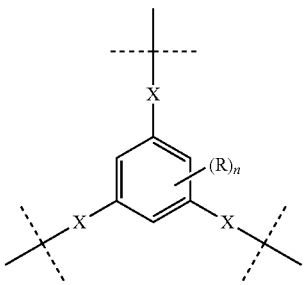

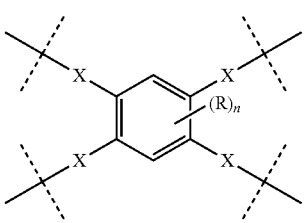

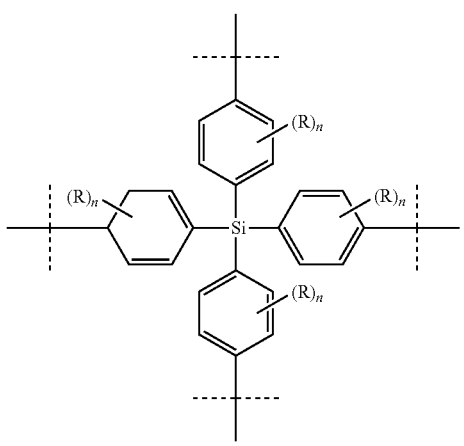

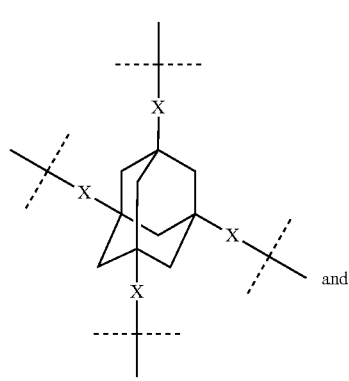

and

-continued

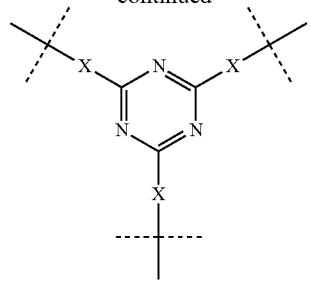

wherein n is an integer of 0, 1, 2, or 3; each R is independently selected from the group consisting of $R^1$, $NH_2$, $NHR^1$, $NR^1_2$, $C(O)OH$, $C(O)OR^1$, $OH$, and $OR^1$; $R^1$ is methyl, or ethyl; X is a phenylene or -≡-, and the dotted lines indicate the binding sites.

6. The shaped body of claim 1, wherein the polymer is a homo polymer.

7. The shaped body of claim 6, wherein the homopolymer consists of a monomer unit

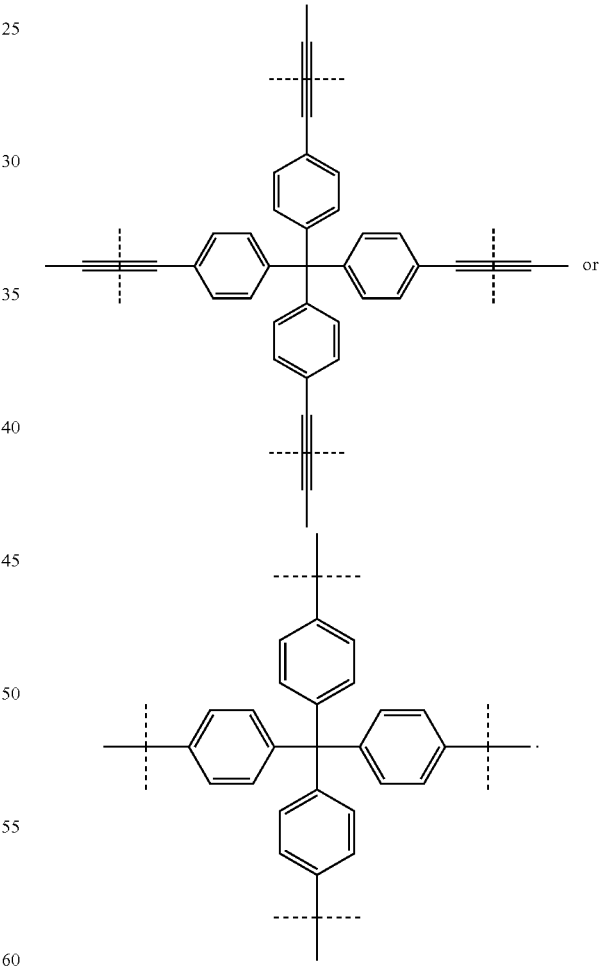

8. The shaped body of claim 1, wherein the at least one binder is an oxygen containing binder.

9. The shaped body of claim 1, wherein the at least one binder is selected from the group consisting of an oxygen-containing aluminum compound, a silicium oxide and a silicium organic compound.

10. The shaped body of claim 1, wherein the at least one binder is selected from Pural® SB, Ludox® AS 40, Silres® MSE100, tetraethyl orthosilicate.

11. The shaped body of claim 1, wherein the amount of the porous aromatic covalent framework polymer based on the total weight of the shaped body is from about 40 to about 99 wt.-%.

12. The shaped body of claim 1, wherein the amount of the at least one binder additive based on the total weight of the shaped body is from about 1 to about 60 wt.-%.

13. A method for preparing a shaped body of claim 1 comprising the steps of
(c) mixing a composition comprising the porous aromatic covalent framework polymer as defined in claim 1 and the at least one binder additive as defined in claim 1; and
(d) molding the composition into a shaped body.

14. The method of claim 13, wherein the molding comprises an extrusion step.

15. A method of processing a substance, the method comprising
up-taking at least one substance using the shaped body of claim 1 for the purposes of its storage, separation, controlled release, chemical reaction or as support.

16. The method of claim 15, wherein the at least one substance is a gas or gas mixture.

17. The shaped body of claim 1, wherein the shaped body has a cutting hardness of about 0.5 N to about 100 N.

18. The shaped body of claim 17, wherein the shaped body has a diameter ranging from about 1 mm to about 10 mm, and a length ranging from about 1 mm to about 30 mm.

19. The shaped body of claim 1, wherein the shaped body has a surface area above about 50 $m^2/g$.

20. The method of claim 13, further comprising preparing a paste-like mass or a fluid containing the porous aromatic covalent framework polymer material and the binder prior to molding.

* * * * *